United States Patent
Manzoor

(10) Patent No.: US 11,353,622 B2
(45) Date of Patent: Jun. 7, 2022

(54) SYSTEMS AND METHODS FOR HYDROCARBON RESERVOIR THREE DIMENSIONAL UNSTRUCTURED GRID GENERATION AND DEVELOPMENT

(71) Applicant: Saudi Arabian Oil Company, Dhahran (SA)

(72) Inventor: Shahid Manzoor, Al Khubar (SA)

(73) Assignee: Saudi Arabian Oil Company, Dbabran (SA)

( * ) Notice: Subject to any disclaimer, the term of this patent is extended or adjusted under 35 U.S.C. 154(b) by 261 days.

(21) Appl. No.: 16/734,576

(22) Filed: Jan. 6, 2020

(65) Prior Publication Data

US 2021/0208304 A1 Jul. 8, 2021

(51) Int. Cl.
*G01V 99/00* (2009.01)
*G06T 17/05* (2011.01)
*G06T 17/20* (2006.01)

(52) U.S. Cl.
CPC ............ *G01V 99/005* (2013.01); *G06T 17/05* (2013.01); *G06T 17/205* (2013.01); *G01V 2210/66* (2013.01); *G06T 2200/04* (2013.01)

(58) Field of Classification Search
CPC ..... G01V 99/005; G06T 17/05; G06T 17/205; G06T 2200/04
See application file for complete search history.

(56) References Cited

U.S. PATENT DOCUMENTS

| | | | |
|---|---|---|---|
| 6,018,497 A * | 1/2000 | Gunasekera | G01V 1/50 367/72 |
| 6,078,869 A | 6/2000 | Gunasekera | |
| 6,907,392 B2 | 6/2005 | Bennis et al. | |

(Continued)

FOREIGN PATENT DOCUMENTS

GB 2326747 A 12/1998

OTHER PUBLICATIONS

Manzoor, S., Edwards, M.G., Dogru, A.H. et al. Interior boundary-aligned unstructured grid generation and cell-centered versus vertex-centered CVD-MPFA performance. Comput Geosci 22, 195-230 (2018). (Year: 2018).*
N.P. Weatherill,Delaunay triangulation in computational fluid dynamics, Computers & Mathematics with Applications, vol. 24, Issues 5-6, 1992,pp. 129-150, ISSN 0898-1221 (Year: 1992).*

(Continued)

*Primary Examiner* — Rehana Perveen
*Assistant Examiner* — John Asija
(74) *Attorney, Agent, or Firm* — Bracewell LLP; Constance G. Rhebergen; Christopher L. Dryamalla

(57) ABSTRACT

System and method of developing a hydrocarbon reservoir that includes the following: determining, for each of the layers, a reservoir model defining layers representing a portion of a hydrocarbon reservoir; determining points of intersection; generating, for each of the layers, a two-dimensional (2D) unstructured mesh layer including a tri-angulated mesh; generating, for each pair of adjacent 2D unstructured mesh layers of the reservoir model, a three-dimensional (3D) tetrahedral mesh; generating, for the 3D tetrahedral mesh, a 3D triangulated tetrahedral mesh; generating, for the 3D triangulated tetrahedral mesh, a 3D vertically-refined triangulated tetrahedral mesh; generating, for the 3D vertically-refined triangulated tetrahedral mesh, a 3D dual mesh; and generating, using the 3D dual mesh, a simulation of the hydrocarbon reservoir represented by the layers.

30 Claims, 6 Drawing Sheets

(56) References Cited

U.S. PATENT DOCUMENTS

| | | | |
|---|---|---|---|
| 7,047,165 B2 | 5/2006 | Balaven et al. | |
| 7,451,066 B2 | 11/2008 | Edwards et al. | |
| 7,596,480 B2 | 9/2009 | Fung et al. | |
| 7,634,395 B2 | 12/2009 | Flandrin et al. | |
| 7,932,904 B2 | 4/2011 | Branets et al. | |
| 8,212,814 B2 | 7/2012 | Branets et al. | |
| 8,463,586 B2 | 6/2013 | Mezghani et al. | |
| 10,254,440 B2* | 4/2019 | Borouchaki | G01V 99/005 |
| 2002/0032550 A1* | 3/2002 | Ward | G06F 30/23 |
| | | | 703/2 |
| 2006/0025976 A1* | 2/2006 | Kennon | G06T 17/20 |
| | | | 703/10 |
| 2011/0313745 A1 | 12/2011 | Mezghani et al. | |
| 2012/0136636 A1* | 5/2012 | Kleine | G01V 99/005 |
| | | | 703/2 |
| 2012/0221302 A1* | 8/2012 | Lewandowski | G01V 11/00 |
| | | | 703/2 |
| 2014/0236559 A1 | 8/2014 | Fung et al. | |
| 2015/0260016 A1 | 9/2015 | Fung et al. | |
| 2015/0260017 A1 | 9/2015 | Ding et al. | |
| 2017/0299770 A1* | 10/2017 | Brewer | G01V 99/005 |
| 2018/0196162 A1 | 7/2018 | Fung et al. | |
| 2018/0348401 A1* | 12/2018 | Imhof | G06T 17/05 |

OTHER PUBLICATIONS

International Search Report and Written Opinion for International Application No. PCT US2021/012360, report dated Apr. 28, 2021; pp. 1-19.

Li, Xin et al.; "Generalized prism grid: a pillar-based unstructured grid for simulation of reservoirs with complicated geological geometries" Computational Geosciences (2018) 22; pp. 1561-1581.

Manzoor, Shahid et al.; "Interior boundary-aligned unstructured grid generation and cell-centered versus vertex-centered CVD-MPFA performance" Journal of Computational Geoscience, vol. 22, 2018; pp. 195-230.

Sazonov, Igor et al.; "A stitching method for the generation of unstructured meshes for use with co-volume solution techniques" Comput. Methods Appl. Mech. Engrg. 195 (2006); pp. 1826-1845.

Wolfram MathWorld "Delaunay Triangulation" available as of Jan. 9, 2019 at http://mathworld.wolfram.com/DelaunayTriangulation.html; p. 1.

* cited by examiner

SYSTEMS AND METHODS FOR HYDROCARBON RESERVOIR THREE DIMENSIONAL UNSTRUCTURED GRID GENERATION AND DEVELOPMENT

FIELD

Embodiments relate generally to developing hydrocarbon reservoirs, and more particularly to hydrocarbon reservoir simulation and development.

BACKGROUND

A rock formation that resides underground is often referred to as a "subsurface formation." A porous or fractured rock formation that contains, or that is expected to contain, a subsurface pool of hydrocarbons, such as oil and gas, is often referred to as a "hydrocarbon reservoir." In many instances, hydrocarbons are extracted (or "produced") from a hydrocarbon reservoir by way of a well. A well generally includes a wellbore (or "borehole") that is drilled into the Earth. A hydrocarbon well may extend into a hydrocarbon reservoir to, for example, facilitate extraction of hydrocarbons from the reservoir, the injection of fluids into the reservoir, or the evaluation and monitoring of the reservoir.

Exploration for and production of hydrocarbons can involve multiple complex phases to optimize extraction of the hydrocarbons. For example, a reservoir operator may spend time and effort assessing a hydrocarbon reservoir to identify economical and environmentally responsible ways to extract hydrocarbons from the reservoir. This can include identifying where the hydrocarbons are located in the reservoir and generating a field development plan (FDP) that outlines procedures for extracting hydrocarbons from the reservoir. A FDP may specify, for example, locations, trajectories or operational parameters of production wells, injection wells and monitoring wells. In many instances, operators rely on simulations to characterize a reservoir, and develop a FDP based on the characterization. For example, an operator may run simulations of a reservoir to determine where fluids, such as water and hydrocarbons, are located in the reservoir and how they are expected to move within the reservoir, and use the results of the simulations to generate or adjust an FDP for the reservoir. In many instances, simulations are run and FDPs are updated over the course of development of a reservoir. For example, initial simulations may be run to determine locations and operating parameters for a wells before they are drilled, and follow-up simulations may be run to determine updated operating parameters for the wells already drilled, and locations and operating parameters for additional wells to be drilled. Thus, simulations can be an important aspect of developing a reservoir.

SUMMARY

Successful development of a hydrocarbon reservoir often depends on the ability to provide accurate and timely simulations of the reservoir. For example, a reservoir operator may be able to identify movement of hydrocarbons and other substances, such as injected water, within a reservoir based on a simulation, and oversee operation of the reservoir accordingly. This can include locating wells and adjusting well operating parameters, such as production and injection rates, to optimize extraction of hydrocarbons from the reservoir.

Simulations of a reservoir often involves representing the reservoir with a three-dimensional (3D) grid of individual cells. The grids often take the form of a structured grid (for example, formed of 3D volumes, such as cubes, arranged in rows and columns), unstructured grids (for example, formed of 3D volumes, such a pyramids or prisms, that do not lend themselves to arrangement in a row and column format), or a hybrid grid (for example, having both structured and unstructured portions). During a simulation run, the cells of a grid may be processed in parallel by different computing processes. In some instances, a grid can include millions or billions of cells, and the simulation run can involve hundreds or thousands of processors working in parallel and exchanging information regarding the particular cells they are processing. Unfortunately, even with the implementation of a relatively large number of processors, simulations can still require a great deal of time to complete—in some instances taking hours, days, weeks or months to complete. Thus, simulations can be costly from the perspective of computing resources, and may introduce delays into developing and updating field development plans (FDPs) for a reservoir. In the case of limited computing resources, a field operator may have to forgo simulations simply because the resources are not available. Accordingly, efficient use of computing resources can be helpful in providing accurate and timely simulations, and effective development of one or more reservoirs.

Prior attempts to improve simulation performance, including attempts to improve simulation accuracy, speed or efficiency, have shortcomings. For example, reducing the number of cells of a model may reduce accuracy of a corresponding simulation, and increasing the number of cells of a model may increase processing overhead of a corresponding simulation. Thus, generating a suitable model can include reducing or increasing cells in a model to find a balance between speed and accuracy. Within that balance, there are challenges associated with identifying which areas of the model can and should be modified, and making any modifications in a manner that honors elements of the reservoir being modeled (such as well and geological features within the reservoir) and in a manner that is computationally possible and efficient.

In instances, the portions of a grid representing an area surrounding a well is subject to local refinement. This can include dividing the cells representing the area surrounding a well into more/smaller cells. During simulation, the increased number of cells surrounding the well may provide a relatively high level of granularity that helps to generate an accurate representation of interactions between the well and the surrounding portions of the reservoir. In many instances, a model of a reservoir includes a three-dimensional (3D) grid formed of "stacked" grids that each represent a horizontal slice (or "layer") of the reservoir. In these cases, local refinement around a well typically includes dividing the cells of the layers intersected by and surrounding the well bore, and repeating this same division vertically through all of the layers. For example, if a given cell of a top layer is divided into four cells, the cells located "under" the given cell (for example, the cells located vertically underneath the given cell, in the intermediate layer(s) and the bottom layer) may each be divided in the same manner into four cells. Thus, if there are three layers, the three vertically aligned cells may be divided into a total of twelve cells. Although the increased number of cells may provide enhanced accuracy, the increase can also increase processing overhead due the increased number of cells that are processed to generate a simulation of the reservoir. Although three layers and a single well are discussed for the purpose of illustration, reservoirs can have thousands of wells and be represent by grids with hundreds or thousands of layers. Thus, these types of local refinements can have a significant impact on the balance of accuracy and efficiency of simulations.

In view of these and other shortcomings of existing techniques for hydrocarbon reservoir simulation, developed are novel systems and methods for generating unstructured grids that include local refinement of cells that are intersected by a wellbore of a well. For example, where a reservoir model includes three layers representing respective portions of a hydrocarbon reservoir, and a well extends vertically through the first (top) layer and the second (middle) layer but does not intersect the third (bottom) layer, local refinement for the well may include refining the two cells intersected by the well (and not refining the cell of the third layer that is not intersected by the well). This may result in a total of nine cells (for example, four "refined" cells for each of the cells of the first and second layers intersected by the well, and one "un-refined" cell for the cell of the third layer not intersected by the well), as opposed to the twelve cells of the example previously described. This can provide enhanced accuracy for the cells intersected by the well, without unnecessarily increasing the number of cells in areas not intersected by a well.

In some embodiments, generation of an unstructured grid of a model of a hydrocarbon reservoir having a well includes the following: (1) for each layer of the model of the reservoir, identifying points of intersection with the wellbore of the well (for example, where the top two of three layers representing the reservoir are intersected by the wellbore of the well, identifying the points where the wellbore intersects the first and second layers); (2) for each layer of the model of the reservoir, generating a two dimensional (2D) unstructured mesh layer that includes a triangulated mesh, having triangulated refinements at each of the points of intersection identified for the layer (for example, refining/dividing the cells corresponding to the points where the well intersects the first and second layers); (3) for each pair of adjacent unstructured mesh layers of the model of the reservoir, generating a 3D tetrahedral mesh by connecting corresponding points of the adjacent 2D unstructured mesh layers (for example, connecting the first layer to the second layer by way of Delaunay meshing, and connecting the second layer to the third layer by way of Delaunay meshing); (4) conducting interlayer well segment triangulation of 3D tetrahedral mesh to generate a 3D triangulated tetrahedral mesh (for example, conducting stitching to mesh interlayer well segments in the 3D tetrahedral mesh); (5) conducting vertical refinement of the 3D triangulated tetrahedral mesh to generate a 3D vertically-refined triangulated tetrahedral mesh (for example, generating respective intermediate layers (of the 3D triangulated tetrahedral mesh) formed of vertical prisms connecting corresponding points of upward and downward shunted representations of the layer); and (6) conducting meshing of the 3D vertically-refined triangulated tetrahedral mesh to generate a 3D dual mesh that includes polyhedron cells (for example, conducting Delaunay meshing of the 3D vertically-refined triangulated tetrahedral mesh to generate a dual mesh that includes polyhedron shaped cells).

Provided in some embodiments is a method of developing a hydrocarbon reservoir that includes the following: determining a reservoir model of a hydrocarbon reservoir, the reservoir model defining layers representing a portion of the hydrocarbon reservoir; determining, for each of the layers of the model, any points of intersection for the layer, the points of intersection defined by one or more points at which the layer is intersected by a path of a well bore extending into the hydrocarbon reservoir; generating, for each of the layers of the model, a two-dimensional (2D) unstructured mesh layer including a triangulated mesh, the triangulated mesh including triangulated refinements at any points of intersection determined for the layer; generating, for each pair of adjacent 2D unstructured mesh layers of the reservoir model, a three-dimensional (3D) tetrahedral mesh, the generating of the 3D tetrahedral mesh including connecting corresponding points of the pair of adjacent 2D unstructured mesh layers; generating, for the 3D tetrahedral mesh, a 3D triangulated tetrahedral mesh, the generating of the 3D triangulated tetrahedral mesh including interlayer well segment triangulation of the 3D tetrahedral mesh, generating, for the 3D triangulated tetrahedral mesh, a 3D vertically-refined triangulated tetrahedral mesh, the generating of the 3D vertically-refined triangulated tetrahedral mesh including vertically refining the 3D triangulated tetrahedral mesh; generating, for the 3D vertically-refined triangulated tetrahedral mesh, a 3D dual mesh, the generating of the 3D dual mesh including meshing of the 3D vertically-refined triangulated tetrahedral mesh; and generating, using the 3D dual mesh, a simulation of the hydrocarbon reservoir represented by the layers.

In some embodiments, at least one layer of the layers does not contain a point of intersection and the 2D unstructured mesh layer for the at least one of the layer does not include triangular refinements. In some embodiments, at least one of the points of intersection is defined by one or more points where a layer of the reservoir model is intersected by geologic feature of the hydrocarbon reservoir. In some embodiments, the triangulated refinements for each of the points of intersection includes a 2D cell including the point of intersection being divided into cells of a first size and a cell located away from the point of intersection being divided into cells a second size that is greater than first size. In some embodiments, the generating of the 3D tetrahedral mesh for a pair of adjacent layers includes conducting a Delaunay meshing operation on the pair of adjacent layers to connect the corresponding points of the adjacent 2D unstructured mesh layers. In some embodiments, the generating of the 3D triangulated tetrahedral mesh includes conducting stitching to mesh interlayer well segments in the 3D tetrahedral mesh. In some embodiments, the generating of the 3D vertically-refined triangulated tetrahedral mesh includes connecting corresponding points of upward and downward shunted representations of adjacent pairs of the layers of the 3D triangulated tetrahedral mesh to generate respective intermediate layers formed of vertical prisms extending between the respective pairs of 3D triangulated tetrahedral mesh layers. In some embodiments, the generating of the 3D vertically-refined triangulated tetrahedral mesh includes conducting a Delaunay meshing operation on the 3D vertically-refined triangulated tetrahedral mesh to generate the 3D dual mesh formed of polyhedron shaped cells. In some embodiments, the method further includes generating, based on the simulation of the hydrocarbon reservoir, a FDP for the simulation of the hydrocarbon reservoir. In some embodiments, the method further includes: identifying, based on the simulation of the hydrocarbon reservoir, well drilling parameters; and drilling, based on the well drilling parameters, a well in the hydrocarbon reservoir. In some embodiments, the method further includes: identifying, based on the simulation of the hydrocarbon reservoir, well operating parameters; and operating, based on the well operating parameters, a well in the hydrocarbon reservoir.

Provided in some embodiments is a non-transitory computer readable storage medium including program instructions stored thereon that are executable by a processor to perform the following operations for developing a hydrocarbon reservoir: determining a reservoir model of a hydrocarbon reservoir, the reservoir model defining layers representing a portion of the hydrocarbon reservoir; determining, for each of the layers of the model, any points of intersection for the layer, the points of intersection defined by one or more points at which the layer is intersected by a path of a well bore extending into the hydrocarbon reservoir; generating, for each of the layers of the model, a two-dimensional (2D) unstructured mesh layer including a triangulated mesh, the triangulated mesh including triangulated refinements at any points of intersection determined for the layer; generating, for each pair of adjacent 2D unstructured mesh layers of the reservoir model, a three-dimensional (3D) tetrahedral mesh, the generating of the 3D tetrahedral mesh including connecting corresponding points of the pair of adjacent 2D unstructured mesh layers: generating, for the 3D tetrahedral mesh, a 3D triangulated tetrahedral mesh, the generating of the 3D triangulated tetrahedral mesh including interlayer well segment triangulation of the 3D tetrahedral mesh; generating, for the 3D triangulated tetrahedral mesh, a 3D vertically-refined triangulated tetrahedral mesh, the generating of the 3D vertically-refined triangulated tetrahedral mesh including vertically refining the 3D triangulated tetrahedral mesh; generating, for the 3D vertically-refined triangulated tetrahedral mesh, a 3D dual mesh, the generating of the 3D dual mesh including meshing of the 3D vertically-refined triangulated tetrahedral mesh; and generating, using the 3D dual mesh, a simulation of the hydrocarbon reservoir represented by the layers.

In some embodiments, at least one layer of the layers does not contain a point of intersection and the 2D unstructured mesh layer for the at least one layer does not include triangular refinements. In some embodiments, at least one of the points of intersection is defined by one or more points where a layer of the reservoir model is intersected by geologic feature of the hydrocarbon reservoir. In some embodiments, the triangulated refinements for each of the points of intersection includes a 2D cell including the point of intersection being divided into cells of a first size and a cell located away from the point of intersection being divided into cells a second size that is greater than first size. In some embodiments, the generating of the 3D tetrahedral mesh for a pair of adjacent layers includes conducting a Delaunay meshing operation on the pair of adjacent layers to connect the corresponding points of the adjacent 2D unstructured mesh layers. In some embodiments, the generating of the 3D triangulated tetrahedral mesh includes conducting stitching to mesh interlayer well segments in the 3D tetrahedral mesh. In some embodiments, the generating of the 3D vertically-refined triangulated tetrahedral mesh includes connecting corresponding points of upward and downward shunted representations of adjacent pairs of the layers of the 3D triangulated tetrahedral mesh to generate respective intermediate layers formed of vertical prisms extending between the respective pairs of 3D triangulated tetrahedral mesh layers. In some embodiments, the generating of the 3D vertically-refined triangulated tetrahedral mesh includes conducting a Delaunay meshing operation on the 3D vertically-refined triangulated tetrahedral mesh to generate the 3D dual mesh formed of polyhedron shaped cells. In some embodiments, the operations further include generating, based on the simulation of the hydrocarbon reservoir, a FDP for the simulation of the hydrocarbon reservoir. In some embodiments, the operations further include: identifying, based on the simulation of the hydrocarbon reservoir, well drilling parameters; and drilling, based on the well drilling parameters, a well in the hydrocarbon reservoir. In some embodiments, the operations further include: identifying, based on the simulation of the hydrocarbon reservoir, well operating parameters; and operating, based on the well operating parameters, a well in the hydrocarbon reservoir.

Provided in some embodiments is a hydrocarbon reservoir development system that includes the following: a hydrocarbon reservoir control system non-transitory computer readable storage medium including program instructions stored thereon that are executable by a processor to perform the following operations for developing a hydrocarbon reservoir: determining a reservoir model of a hydrocarbon reservoir, the reservoir model defining layers representing a portion of the hydrocarbon reservoir; determining, for each of the layers of the model, any points of intersection for the layer, the points of intersection defined by one or more points at which the layer is intersected by a path of a well bore extending into the hydrocarbon reservoir; generating, for each of the layers of the model, a two-dimensional (2D) unstructured mesh layer including a triangulated mesh, the triangulated mesh including triangulated refinements at any points of intersection determined for the layer; generating, for each pair of adjacent 2D unstructured mesh layers of the reservoir model, a three-dimensional (3D) tetrahedral mesh, the generating of the 3D tetrahedral mesh including connecting corresponding points of the pair of adjacent 2D unstructured mesh layers; generating, for the 3D tetrahedral mesh, a 3D triangulated tetrahedral mesh, the generating of the 3D triangulated tetrahedral mesh including interlayer well segment triangulation of the 3D tetrahedral mesh, generating, for the 3D triangulated tetrahedral mesh, a 3D vertically-refined triangulated tetrahedral mesh, the generating of the 3D vertically-refined triangulated tetrahedral mesh including vertically refining the 3D triangulated tetrahedral mesh; generating, for the 3D vertically-refined triangulated tetrahedral mesh, a 3D dual mesh, the generating of the 3D dual mesh including meshing of the 3D vertically-refined triangulated tetrahedral mesh; and generating, using the 3D dual mesh, a simulation of the hydrocarbon reservoir represented by the layers.

In some embodiments, at least one layer of the layers does not contain a point of intersection and the 2D unstructured mesh layer for the at least one layer does not include triangular refinements. In some embodiments, at least one of the points of intersection is defined by one or more points where a layer of the reservoir model is intersected by geologic feature of the hydrocarbon reservoir. In some embodiments, the triangulated refinements for each of the points of intersection includes a 2D cell including the point of intersection being divided into cells of a first size and a cell located away from the point of intersection being divided into cells a second size that is greater than first size. In some embodiments, the generating of the 3D tetrahedral mesh for a pair of adjacent layers includes conducting a Delaunay meshing operation on the pair of adjacent layers to connect the corresponding points of the adjacent 2D unstructured mesh layers. In some embodiments, the generating of the 3D triangulated tetrahedral mesh includes conducting stitching to mesh interlayer well segments in the 3D tetrahedral mesh. In some embodiments, the generating of the 3D vertically-refined triangulated tetrahedral mesh includes connecting corresponding points of upward and downward shunted representations of adjacent pairs of the layers of the 3D triangulated tetrahedral mesh to generate respective intermediate layers formed of vertical prisms extending between the respective pairs of 3D triangulated tetrahedral mesh layers. In some embodiments, the generating of the 3D vertically-refined triangulated tetrahedral mesh includes conducting a Delaunay meshing operation on the 3D vertically-refined triangulated tetrahedral mesh to generate the 3D dual mesh formed of polyhedron shaped cells. In some embodiments, the operations further include generating, based on the simulation of the hydrocarbon reservoir, a FDP for the simulation of the hydrocarbon reservoir. In some embodiments, the operations further include: identifying, based on the simulation of the hydrocarbon reservoir, well drilling parameters; and drilling, based on the well drilling parameters, a well in the hydrocarbon reservoir. In some embodiments, the operations further include: identifying, based on the simulation of the hydrocarbon reservoir, well operating parameters; and operating, based on the well operating parameters, a well in the hydrocarbon reservoir.

Figure 1:
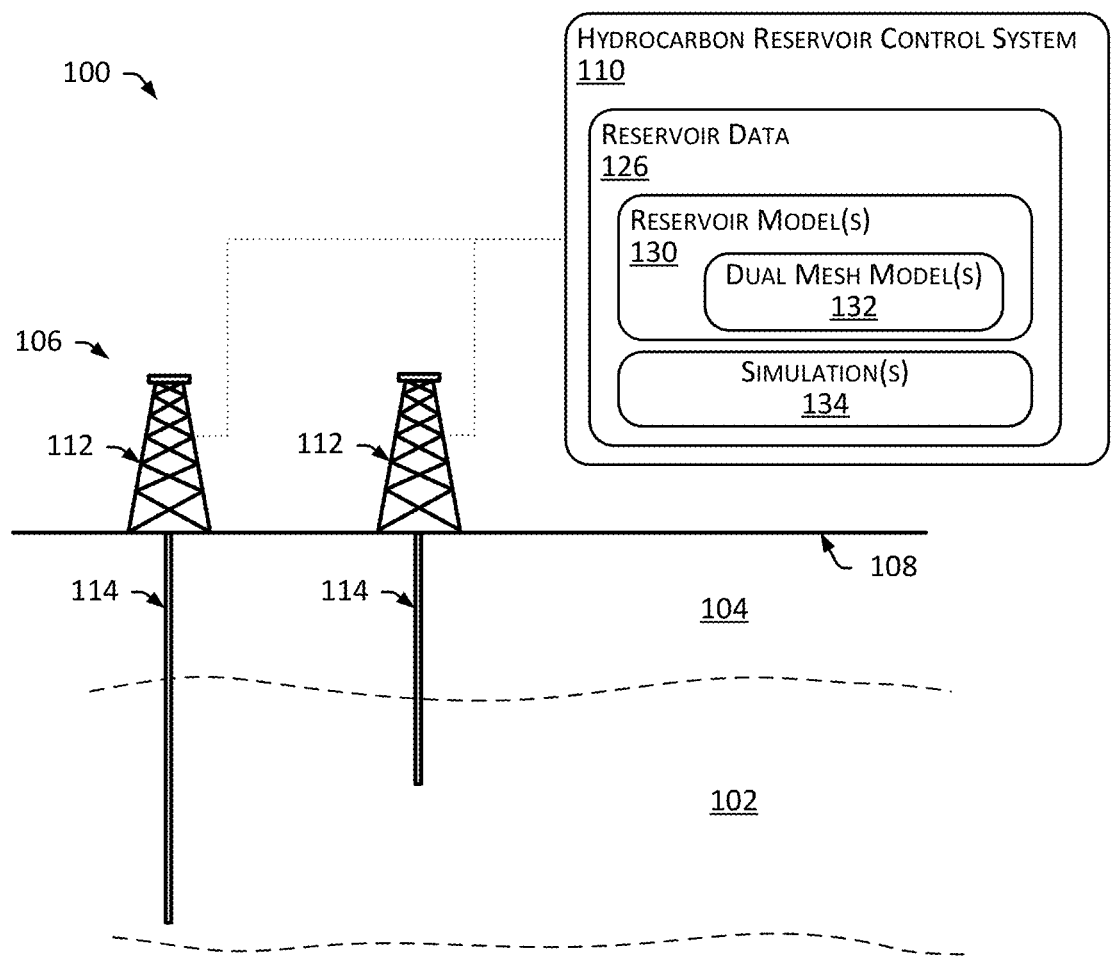
FIG. 1 is diagram that illustrates a hydrocarbon reservoir environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of novel systems and methods for generating and employing unstructured grids that include local refinement of cells that are intersected by a wellbore of a well. For example, where a reservoir model includes three layers representing respective portions of a hydrocarbon reservoir, and a well extends vertically through the first (top) layer and the second (middle) layer but does not intersect the third (bottom) layer, local refinement for the well may include refining the two cells intersected by the well (and not refining the cell of the third layer that is not intersected by the well). This may result in a total of nine cells (for example, four "refined" cells for each of the cells of the first and second layers intersected by the well, and one "un-refined" cell for the cell of the third layer not intersected by the well), as opposed to the twelve cells of the example previously described. This can provide enhanced accuracy for the cells intersected by the well, without unnecessarily increasing the number of cells in areas not intersected by a well.

In some embodiments, generation of an unstructured grid of a model of a hydrocarbon reservoir having a well includes the following: (1) for each layer of the model of the reservoir, identifying points of intersection with the wellbore of the well (for example, where the top two of three layers representing the reservoir are intersected by the wellbore of the well, identifying the points where the wellbore intersects the first and second layers); (2) for each layer of the model of the reservoir, generating a two dimensional (2D) unstructured mesh layer that includes a triangulated mesh, having triangulated refinements at each of the points of intersection identified for the layer (for example, refining/dividing the cells corresponding to the points where the well intersects the first and second layers); (3) for each pair of adjacent unstructured mesh layers of the model of the reservoir, generating a 3D tetrahedral mesh by connecting corresponding points of the adjacent 2D unstructured mesh layers (for example, connecting the first layer to the second layer by way of Delaunay meshing, and connecting the second layer to the third layer by way of Delaunay meshing); (4) conducting interlayer well segment triangulation of 3D tetrahedral mesh to generate a 3D triangulated tetrahedral mesh (for example, conducting stitching to mesh interlayer well segments in the 3D tetrahedral mesh); (5) conducting vertical refinement of the 3D triangulated tetrahedral mesh to generate a 3D vertically-refined triangulated tetrahedral mesh (for example, generating respective intermediate layers (of the 3D triangulated tetrahedral mesh) formed of vertical prisms connecting corresponding points of upward and downward shunted representations of the layer); and (6) conducting meshing of the 3D vertically-refined triangulated tetrahedral mesh to generate a 3D dual mesh that includes polyhedron cells (for example, conducting Delaunay meshing of the 3D vertically-refined triangulated tetrahedral mesh to generate a dual mesh that includes polyhedron shaped cells).

FIG. 1 is a diagram that illustrates a hydrocarbon reservoir environment ("reservoir environment") 100 in accordance with one or more embodiments. In the illustrated embodiment, the reservoir environment 100 includes a hydrocarbon reservoir ("reservoir") 102 located in a subsurface formation ("formation") 104, and a hydrocarbon reservoir development system 106.

The formation 104 may include a porous or fractured rock formation that resides underground, beneath the Earth's surface ("surface") 108. The reservoir 102 may include a portion of the formation 104 that contains (or that is determined or expected to contain) a subsurface pool of hydrocarbons, such as oil and gas. The formation 104 and the reservoir 102 may each include different layers of rock having varying characteristics, such as varying degrees of permeability, porosity or fluid saturations. The hydrocarbon reservoir development system 106 may facilitate the extraction (or "production") of hydrocarbons from the reservoir 102.

In some embodiments, the hydrocarbon reservoir development system 106 includes a hydrocarbon reservoir control system ("control system") 110 and one or more wells 112. In some embodiments, the control system 110 includes a computer system that is the same as or similar to that of computer system 1000 described with regard to at least FIG. 10. Each of the wells 112 may be defined by a wellbore 114 that extends from the surface 108 into a target zone of the formation 104, such as the reservoir 102. The wellbore 114 may be created, for example, by a drill bit boring along a path (or "trajectory") through the formation 104 and the reservoir 102.

In some embodiments, the control system 110 controls operations for development of the reservoir 102. For example, the control system 110 may control logging operations used to acquire data for the reservoir 102, or control processing that generates models and simulations characterizing the reservoir 102 based on the data acquired. In some embodiments, the control system 110 determines drilling parameters or operating parameters for the wells 112 in the reservoir 102, or controls drilling or operating of the wells 112 in accordance with drilling or operating parameters. This can include, for example, the control system 110 determining drilling parameters (for example, determining well locations and trajectories) for the reservoir 102, controlling drilling of the wells 112 in accordance with the drilling parameters (for example, controlling a well drilling system of the hydrocarbon reservoir development system 106 to drill the wells 112 in accordance at the well locations and trajectories), determining operating parameters (for example, determining production rates and pressures for "production" wells 112 and injection rates and pressure for "injections" wells 112), and controlling operations of the wells 112 in accordance with the operating parameters (for example, controlling a well operating system of the hydrocarbon reservoir development system 106 to operate the production wells 112 to produce hydrocarbons from the reservoir 102 in accordance with the production rates and pressures determined for the respective wells 112, and controlling the injection wells 112 to inject substances, such as water, into the reservoir 102 in accordance with the injection rates and pressures determined for the respective wells 112). In some embodiments, the control system 110 determines monitoring parameters or controls operations of monitoring wells 112 accordingly. For example, the control system 110 may determine wellbore logging parameters for monitoring wells 112, and control logging tools and sensors within the wellbores 114 of the monitoring wells 112 in accordance with the wellbore logging parameters for the respective monitoring wells 112.

In some embodiments, the control system 110 stores in a memory, or otherwise has access to, reservoir data 126. The reservoir data 126 may include data that is indicative of properties of the reservoir 102. In some embodiments, the reservoir data 126 includes one or more models 130 of the reservoir 102 (for example, a 3D dual mesh model 132 of the reservoir 102), or one or more simulations 134 of the reservoir 102.

A model 130 of the reservoir 102 may include a three-dimensional (3D) grid of cells (or "grid cells") representing a portion of the reservoir 102. Each of the cells may include a volume (for example, a cube, prism, tetrahedron, or polyhedron shaped cell) that represents a corresponding volume within the reservoir 102, and that is associated with properties of that volume within the reservoir 102. This can include properties of the volume itself, such as a fluid saturation or porosity of the volume within the reservoir 102, as well as interfaces with adjacent cells, such as fluxes representing a fluid interchange between the cell and respective ones of the other cells directly adjacent the cell (for example, between shared faces of adjacent cells). The properties of each of the cells may be determined based on data acquired for the reservoir 102, such as seismic logs of the reservoir 102, downhole logs of wells already drilled into the reservoir 102, data acquired from core samples extracted from the reservoir 102, or recorded data for reservoirs having characteristics similar to those of the reservoir 102.

In some embodiments, a model 130 is represented in "graph form." This can include each of the cells of the model 130 being represented by a vertex of a graph, and each of the respective interfaces between pairs of adjacent cells of the model 130 being represented by an edge of the graph that extends between the respective vertices representing the cells of the pair of adjacent cells. In such a representation, each vertex may be associated with (or be defined by) properties of the respective cell, such as a water saturation of the volume of the reservoir represented by the cell corresponding to the vertex. Each of the edges may be associated with (or be defined by) properties of the corresponding interface between the respective cells of the pair of adjacent cells defining the vertices at the ends of the edge, such as fluid flux between the pair of adjacent cells defining the vertices at the ends of the edge.

A simulation of the reservoir 102 (or "reservoir simulation") may include data that includes a prediction of movement of fluids, such as water or hydrocarbons, within the reservoir 102 over time. In some embodiments, a simulation 134 of the reservoir 102 is generated based on a model 130 of the reservoir 102. For example, a simulation 134 may include a snapshot of where fluid is expected to be within the reservoir 102 one year from now based on a model 130 that indicates present characteristics of the reservoir 102 (such as the current location of water and hydrocarbons in the reservoir 102) and expected operating conditions for the wells 112 in the reservoir 102 over the next year (such as operating parameters for wells 112 in the reservoir 102 over the next year defined in an FDP). In some embodiments, a simulation 134 includes a sequence of snapshots over time that demonstrates the predicted movement of the fluids within the reservoir 102 at different times (for example, at year one, at year two, and at year three). Simulations 134 may be used to determine how to develop the reservoir 102. For example, a simulation 134 of the reservoir 102 may be used to determine drilling or operating parameters for wells 112 in the reservoir 102.

A model 130 may be processed to generate one or more simulations 134 of the reservoir 102. In some embodiments, a model 130 is generated that includes an unstructured grid having local refinement of cells that are intersected by a wellbore of a well 112 (for example, a 3D dual mesh having polyhedron shaped cells generated based on refinements of cells intersected by a wellbore) and the unstructured grid is used to generate a simulation 134 of the reservoir 102. In some embodiments, generation of an unstructured grid of a model 130 of the hydrocarbon reservoir 102 having a well 112 includes the following: (1) for each layer of the model 130 of the reservoir 102, identifying points of intersection with the wellbore 114 of the well 112 (for example, where the top two of three layers representing the reservoir 102 are intersected by the wellbore 114 of the well 112, identifying the points where the wellbore 114 intersects the first and second layers); (2) for each layer of the model 130 of the reservoir 102, generating a two dimensional (2D) unstructured mesh layer that includes a triangulated mesh, having triangulated refinements at each of the points of intersection identified for the layer (for example, refining/dividing the cells corresponding to the points where the wellbore 114 intersects the first and second layers); (3) for each pair of adjacent unstructured mesh layers of the model 130 of the reservoir 102, generating a 3D tetrahedral mesh by connecting corresponding points of the adjacent 2D unstructured mesh layers (for example, connecting the first layer to the second layer by way of Delaunay meshing, and connecting the second layer to the third layer by way of Delaunay meshing); (4) conducting interlayer well segment triangulation of 3D tetrahedral mesh to generate a 3D triangulated tetrahedral mesh (for example, conducting stitching to mesh interlayer well segments in the 3D tetrahedral mesh); (5) conducting vertical refinement of the 3D triangulated tetrahedral mesh to generate a 3D vertically-refined triangulated tetrahedral mesh (for example, generating respective intermediate layers (of the 3D triangulated tetrahedral mesh) formed of vertical prisms connecting corresponding points of upward and downward shunted representations of the layer); and (6) conducting meshing of the 3D vertically-refined triangulated tetrahedral mesh to generate a 3D dual mesh model 132 that includes polyhedron cells (for example, conducting Delaunay meshing of the 3D vertically-refined triangulated tetrahedral mesh to generate a dual mesh that includes polyhedron shaped cells). The 3D dual mesh model 132 may be employed in a simulation operation to generate a simulation 134 of the reservoir 102. The resulting simulation 134 may have enhanced accuracy for the cells intersected by a wellbore 114, without unnecessarily increasing the number of cells in areas not intersected by a wellbore 114.

Figure 2:
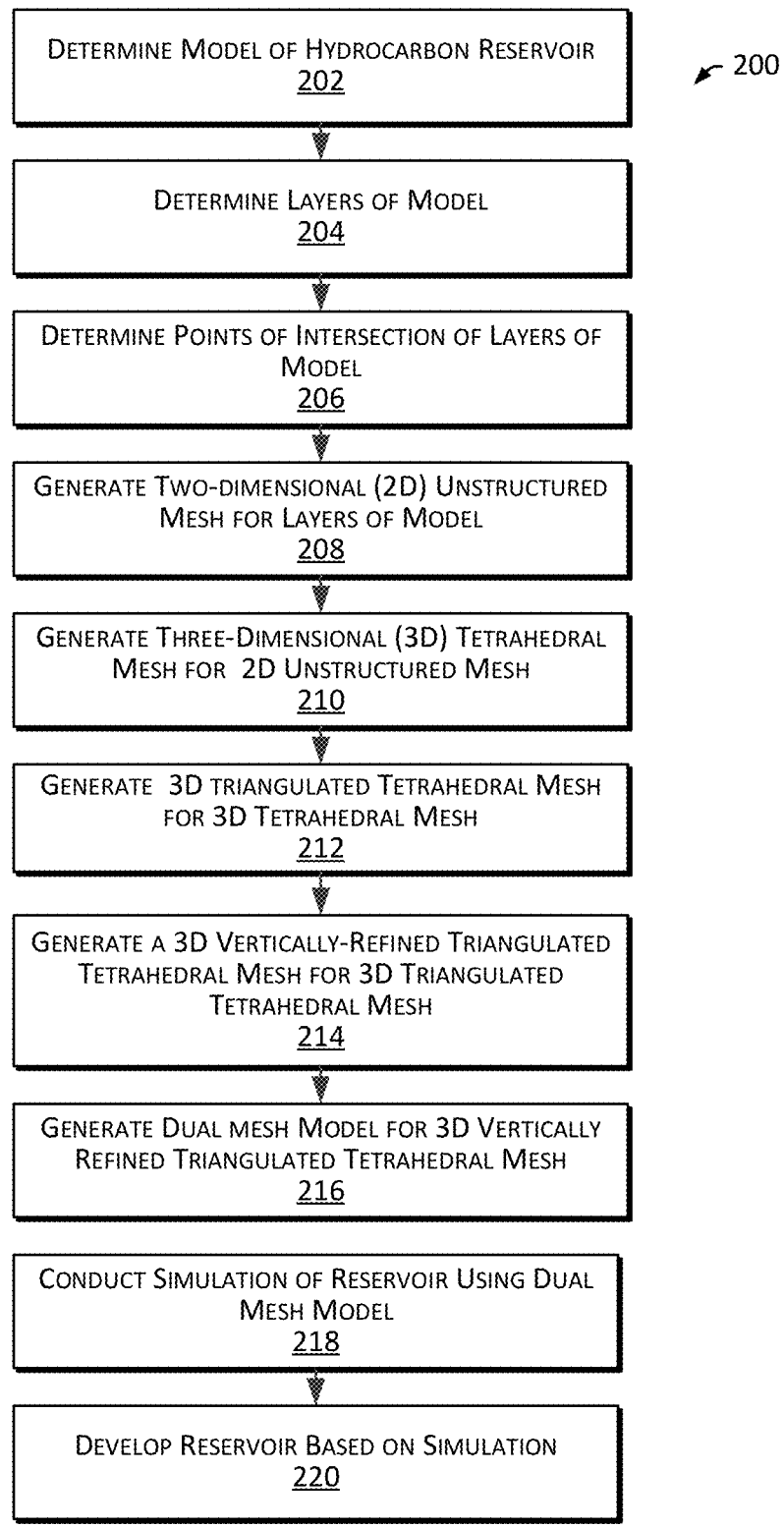
FIG. 2 is a flowchart that illustrates an example method of hydrocarbon reservoir simulation and development in accordance with one or more embodiments.

FIG. 2 is a diagram that illustrates a method 200 of developing a hydrocarbon reservoir in accordance with one or more embodiments. Some or all of the procedural elements of method 200 may be performed, for example, by the control system 110 or another reservoir operator.

Figure 3:
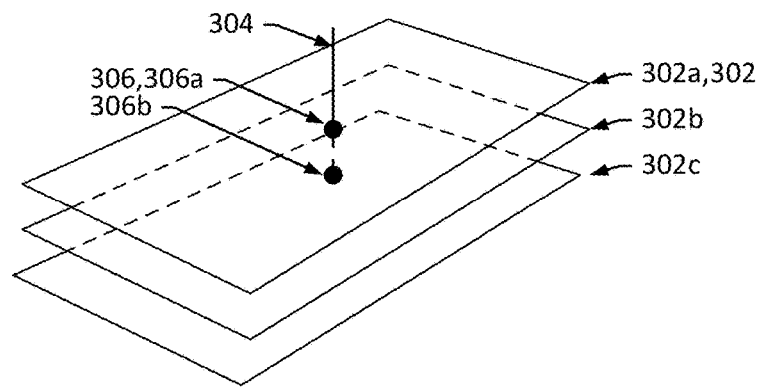
FIG. 3 is a diagram that illustrates layers of a model representing of a portion of a hydrocarbon reservoir intersected by a well in accordance with one or more embodiments.

In some embodiments, the method 200 includes determining a reservoir model of a hydrocarbon reservoir (block 202). Determining a reservoir model of a hydrocarbon reservoir may include obtaining data defining layers representing a portion of the reservoir and trajectories or paths of any wellbores extending into the reservoir. For example, determining a reservoir model of the reservoir 102 may include the control system 110 determining (or retrieving) a model 130 including data defining layers representing a portion of the reservoir 102 and trajectories or paths of the wellbores 114 extending into the reservoir 102. FIG. 3 is a diagram that illustrates a model 130 in accordance with one or more embodiments. In the illustrated embodiment, the model 130 defines three layers 302 (including layers 302a, 302b and 302c) representing a portion of the reservoir 102, and a trajectory (or "path") 304 of a wellbore 114 extending into the reservoir 102, with the trajectory 304 intersecting the top two layers 302a and 302b at respective points of intersection (or "intersection points") 306. The points of intersection 306 include a first point of intersection 306a at the intersection of the trajectory 304 and the first/top layer 302a and a second point of intersection 306b at the intersection of the trajectory 304 and the second/middle layer 302b. In the illustrated embodiment, there is no intersection of the trajectory 304 and the bottom layer 302c.

In some embodiments, the method 200 includes determining layers of the reservoir model (block 204). Determining layers of a reservoir model may include identifying each of the respective layers defined by the reservoir model. For example, determining layers 302 of the reservoir model 130 may include identifying the three layers 302a, 302b and 302c.

In some embodiments, the method 200 includes determining points of intersection of layers of the reservoir model (block 206). Determining points of intersection of layers of a reservoir model may include identifying points where the layers of the reservoir model are intersected by a path of any wellbores (or similar features, such as faults or other geologic features) defined by the reservoir model. For example, determining points of intersection of the layers 302 of the reservoir model 130 may include identifying the two points of intersection 306a and 306b.

Figure 4:
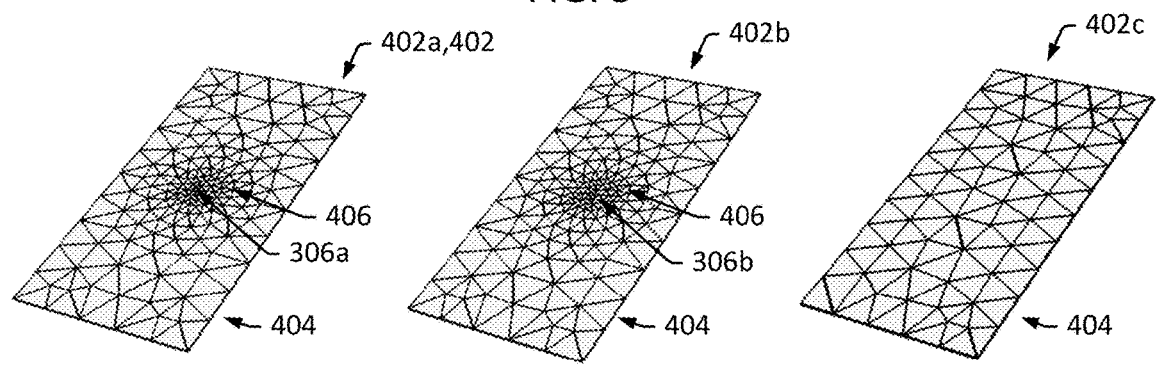
FIG. 4 is a diagram that illustrates two dimensional (2D) unstructured mesh layers in accordance with one or more embodiments.

In some embodiments, the method 200 includes generating a 2D unstructured mesh for the layers of the reservoir model (block 208). Generating a 2D unstructured mesh for the layers of the model may include, for each layer of the model, generating a respective 2D unstructured mesh layer that includes a triangulated mesh having triangulated refinements at each of the points of intersection identified for the layer. The refinements may include dividing (or resizing) the 2D cells of each layer corresponding to the intersection in to relatively smaller cells. For example, generating a 2D unstructured mesh for the layers 302 of the model 130 may include, for each of layers 302a, 302b and 302c, generating a respective 2D unstructured mesh layer that includes a triangulated mesh. The intersected layers 302a and 302b may include respective triangulated refinements for the 2D cells containing the points of intersection 306a and 306b (or refinement of 2D cells adjacent to and surrounding the 2D cells containing the points of intersection 306a and 306b). The refinements for each of the points of intersection 306 may include refined 2D cells at or surrounding the point of intersection 306 being divided into relatively small areas in comparison to cells located farther from the point of intersection 306. FIG. 4 is a diagram that illustrates 2D unstructured mesh layers ("unstructured mesh layers") 402 (including unstructured mesh layers 402a, 402b and 402c) in accordance with one or more embodiments. The unstructured mesh layers 402a, 402b and 402c correspond to layers 302a, 302b and 302c, respectively. The unstructured mesh layers 402a, 402b and 402c each includes a mesh of 2D cells 404, with the 2D cells 404 of the unstructured mesh layers 402a and 402b including refined 2D cells 406 at and surrounding the locations of the points of intersection 306a and 306b. As a result of the layer 302c not having a point of intersection, the mesh layer 402c may not include refined 2D cells.

Figure 9A:
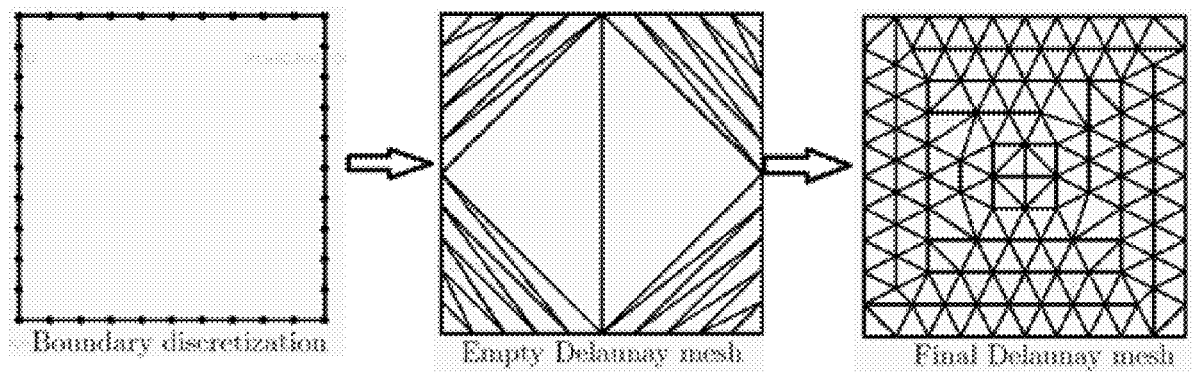
FIG. 9A is a diagram that illustrates meshing techniques in accordance with one or more embodiments.

In some embodiments, a 2D unstructured mesh generation process starts with geo-model (for example, a fine scale structured grid model, which does not honor wells) and a well geometry file. For every layer in the geo-model, layer bounding box and points of intersection(s) are extracted. This may include extract line segments defining layer geometry (for example, a discrete bounding box, and finding refinement points (points of intersection), which are the points where well(s) enters/intersects the underlying layer(s). Triangulation of an input point set may include using a 2D Delaunay triangulation point/data set to define domain boundaries and triangulating intersection (or "interior") points. The resulting mesh may include low quality simplexes (triangles) connecting far ends of domain boundaries and any intersection points, and may be referred to as an "empty mesh." (See, e.g., FIG. 9A). A quality mesh may be generated by adding new interior/field points. Then, a field meshing point distribution function (PDF) is assigned to each boundary and to each of any intersection points. For points constituting bounding box, a point distribution function is established that is representative of spacing between the boundary points. To achieve refinement around the intersection points, relative to boundary points PDF, smaller PDFs are assigned to these intersection points. Unstructured meshing may then be carried out using 2D Delaunay triangulation. Next, the domain is meshed either by introducing candidate (or "field") points at the centroid, or circumcenter, or through edge subdivisions of the elements of the background (or "empty") mesh, or via the advancing front point placement technique. Note that field points may be introduced iteratively until the earlier established point distribution function is honored. The candidate points introduced during each iteration may then be filtered to remove conflicts with existing or previously accepted points. FIG. 9A illustrates an example quality final Delaunay mesh generated from an empty mesh, constructed by triangulating new/field points iteratively in the empty mesh.

In some embodiments, the method 200 includes generating a 3D tetrahedral mesh for the 2D unstructured mesh for the layers of the reservoir model (block 210). Generating a 3D tetrahedral mesh for the 2D unstructured mesh for the layers of the reservoir model may include, for each pair of adjacent unstructured mesh layers of the model of the reservoir, generating a 3D tetrahedral mesh by connecting corresponding points of the adjacent 2D unstructured mesh layers (for example, connecting vertices of the cells of the unstructured mesh layers). This may include conducting a Delaunay meshing operation on each pair of layers to connect the pairs of layers.

Delaunay meshing involves triangulation (or "tetrahedralization") of a convex hull. In the Delaunay triangulation, connections are improved such that none of the spheres circumscribing tetrahedron contains a site in its interior; however, it cannot be guaranteed that connections between given point sets (defining well segments) are present in a prescribed/desired manner, following an input curve-mesh (for example, a well/well-segment). Thus to ensure integrity of interlayer well segment, the Delaunay triangulation algorithm may be coupled with an edge/feature recovery technique. Such a limitation of Delaunay mesh generation algorithms is known. Methods used to constrain a mesh to honor features/boundaries are classified into two groups including conformal (local refinement) or stitching, and non-conformal (local reconnection/swapping with/without Steiner or additional points) recovery. In the conformal recovery technique new points are triangulated subject to the insphere criterion, and the resulting mesh with desired recovered connections have the Perpedicular-Bisectional (PEBI) property ensuring mesh quality and is required by industry standard two point flux approximation (TPFA). Here a conformal recovery (or "stitching") technique is used to recover missing connection if there exist any. Conformal edge/segment recovery is achieved with the use of additional ("Steiner") points, introduced recursively splitting missing connections (for example, edges/well-segment/line-segment). The conformal boundary recovery technique operates in an iterative manner, wherein during every level edge-connections are recovered by adding new points each one at a time, and missing connections are recovered, as a concatenation of sub-edges (for example, sub well/line segments) supported by the Steiner (or "additional/stitching") point(s).

Figure 5:
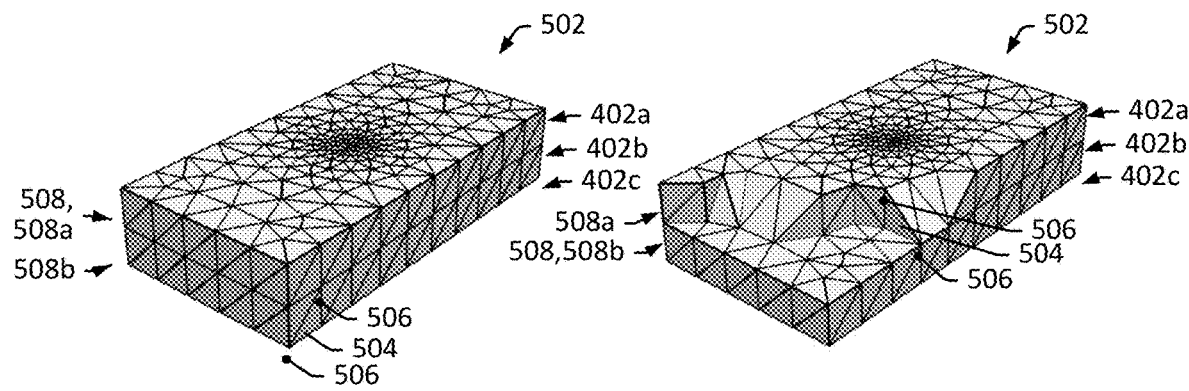
FIG. 5 is a diagram that illustrates a 3D tetrahedral mesh in accordance with one or more embodiments.

With regard to FIGS. 4-5, generating a 3D tetrahedral mesh for the 2D unstructured mesh 402 for the layers 302 of the reservoir model 130 may include, conducting a Delaunay meshing operation for the first pair of adjacent unstructured mesh layers 402a and 402b and for second pair of adjacent unstructured mesh layers 402b and 402c to connect corresponding points of the adjacent 2D unstructured mesh layers, to generate a 3D tetrahedral mesh for the layers 302 of the model 130. FIG. 5 is a diagram that illustrates a 3D tetrahedral mesh ("tetrahedral mesh") 502 in accordance with one or more embodiments. The tetrahedral mesh 502 includes connections 504 between adjacent points 506 of the adjacent pairs of the unstructured mesh layers 402. The diagram on the right includes a cut-away that illustrates connections 504 made between "interior" points 506 of the pairs of layer 402a and 402b. The tetrahedral mesh is formed of the two resulting 3D tetrahedral mesh layers 508 formed between the unstructured mesh layers 402 (for example, including a 3D tetrahedral mesh layers 508a and 508b formed between unstructured mesh layers 402a and 402b, respectively). In some embodiments, generating a 3D mesh with tetrahedral elements connecting layers employs standard a Delaunay method with circumsphere as Delaunay criterion. In three dimensions the simplex used for Delaunay meshes may be the tetrahedron, and Delaunay triangulation satisfies the empty circumsphere property (that is, every simplex constituting a Delaunay grid does not contain any other mesh point within its circumcircle circumsphere).

Figure 6:
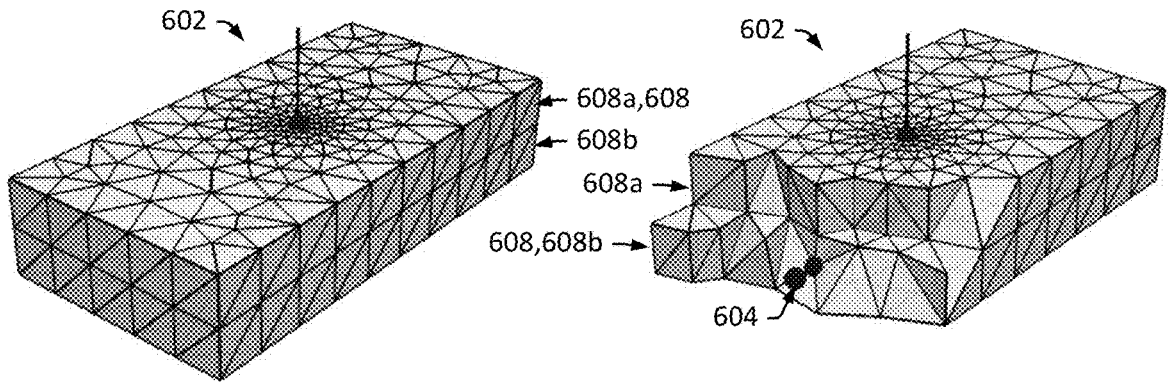
FIG. 6 is a diagram that illustrates a 3D triangulated tetrahedral mesh in accordance with one or more embodiments.

In some embodiments, the method 200 includes generating a 3D triangulated tetrahedral mesh for the 3D tetrahedral mesh (block 212). Generating a 3D triangulated tetrahedral mesh for the 3D tetrahedral mesh may include conducting interlayer well segment triangulation of the 3D tetrahedral mesh to generate a 3D triangulated tetrahedral mesh. This may include conducting stitching to mesh interlayer well segments in the 3D tetrahedral mesh. Unstructured mesh generation algorithms may mesh each point one at a time (that is, they are incremental insertion algorithms). An interlayer well or a portion of well may be comprised of a set of line segments located/placed intermediate of two contiguous layers. A point set defining such an interlayer well (or portion of the well) may be meshed by inserting each such point one by one. Generating a 3D triangulated tetrahedral mesh for the 3D tetrahedral mesh 502 may include conducting a stitching operation to mesh interlayer well segments in the 3D tetrahedral mesh 502. FIG. 6 is a diagram that illustrates a 3D triangulated tetrahedral mesh ("triangulated tetrahedral mesh") 602 in accordance with one or more embodiments. The triangulated tetrahedral mesh 602 includes mesh interlayer well segments where the "dots" 604 constitute a representative interlayer well segment. The diagram on the right includes a cut-away that illustrates interlayer well segments 604 in the "interior" of the triangulated tetrahedral mesh 602. The triangulated tetrahedral mesh 602 may be formed of the two resulting 3D triangulated tetrahedral mesh layers 608 (for example, including a 3D triangulated tetrahedral mesh layers 608a and 608b).

Figure 7:
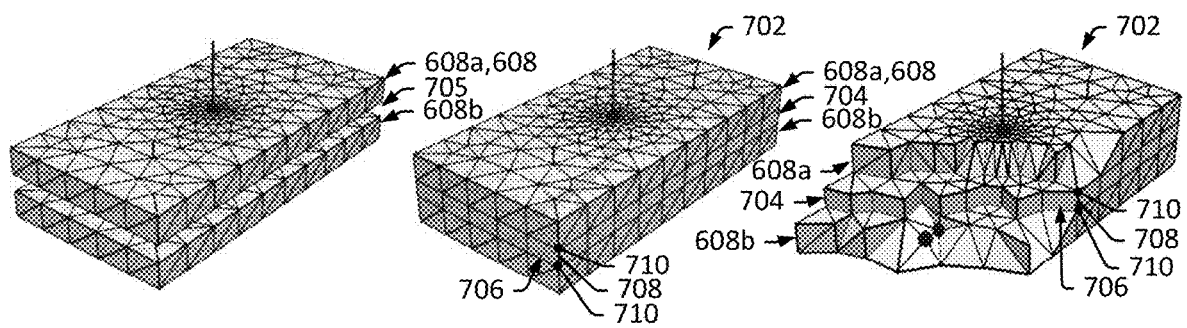
FIG. 7 is a diagram that illustrates a 3D vertically-refined triangulated tetrahedral mesh in accordance with one or more embodiments.

In some embodiments, the method 200 includes generating a 3D vertically-refined triangulated tetrahedral mesh for the 3D triangulated tetrahedral mesh (block 214). Generating a 3D vertically-refined triangulated tetrahedral mesh for the 3D triangulated tetrahedral mesh may include conducting vertical refinement of the 3D triangulated tetrahedral mesh to generate a 3D vertically-refined triangulated tetrahedral mesh. This may include connecting corresponding points of upward and downward shunted representations of adjacent pairs of 3D triangulated tetrahedral mesh layers to generate respective intermediate layers formed of vertical prisms extending in a "shunted" region located between the respective pairs of 3D triangulated tetrahedral mesh layers which is formed by the shunting of the layers away from one another. For example, generating a 3D vertically-refined triangulated tetrahedral mesh for the 3D triangulated tetrahedral mesh 602 may include conducting vertical refinement of the 3D triangulated tetrahedral mesh 602 to generate a 3D vertically-refined triangulated tetrahedral mesh. This may include, for each pair of triangulated tetrahedral mesh layers 608, connecting corresponding points (for example, previously shared vertices) of upward and downward shunted representations of the pair of triangulated tetrahedral mesh layers 608 to generate respective intermediate layers formed of vertical prisms extending between previously shared vertices of the pair of triangulated tetrahedral mesh layers. FIG. 7 is a diagram that illustrates a 3D vertically-refined triangulated tetrahedral mesh ("vertically-refined triangulated tetrahedral mesh") 702 in accordance with one or more embodiments. The vertically-refined triangulated tetrahedral mesh 702 includes an intermediate layer 704 defined by vertical prisms 706 which are each defined by connections 708 made between corresponding points 710 (for example, previously shared vertices) of upward and downward shunted representations of the pair of triangulated tetrahedral mesh layers 608. The far left diagram of FIG. 7 illustrates the separation between (or "shunting") of the pair of triangulated tetrahedral mesh layers 608 that creates a shunted region 705, and the far right diagram of FIG. 7 includes a cut-away that illustrates vertical prisms 706, connections 708 and points 710 located in the "interior" of the vertically-refined triangulated tetrahedral mesh 702.

With regard to shunting, grids used in reservoir simulation are typically dual grids and numerical methods are cell-centered. Mesh generation may be performed in primal framework, for example, by using primal elements (such as a tetra, pyramid, prism, or hexahedron). A dual may be derived from an underlying primal mesh and comprise a polyhedron. The primal mesh layers may be embedded and are honored with respect to primal elements faces (for example, primal cell faces are aligned with the layers and are not allowed to cross the layers). Geological layers honored with respect to primal cell faces, may not be honored in the dual mesh with respect to faces of dual cells. Thus, before constructing a dual mesh a special treatment may be provided (for example, layers are protected with the prisms). In order to generate a dual-cell boundary (or "layer") aligned grid, surfaces characterizing geological layers may be provided with special treatment. For example, geological layers are embedded as triangulated surfaces, and halos comprised of prismatic cells are constructed such that honored layers can be retrieved as medial surfaces of the halo elements. Halo construction may be performed by pushing (or "shunting") points constituting layer(s) in the normal direction upward and downward by a small distance, so as to enclose geological layers with prismatic elements, such that these layers can be retrieved as medial surfaces of the associated prismatic layers. The shunt spacing may be user prescribed, and is typically limited to 50% of spacing between neighboring layers in the underlying geo model.

Figure 8:
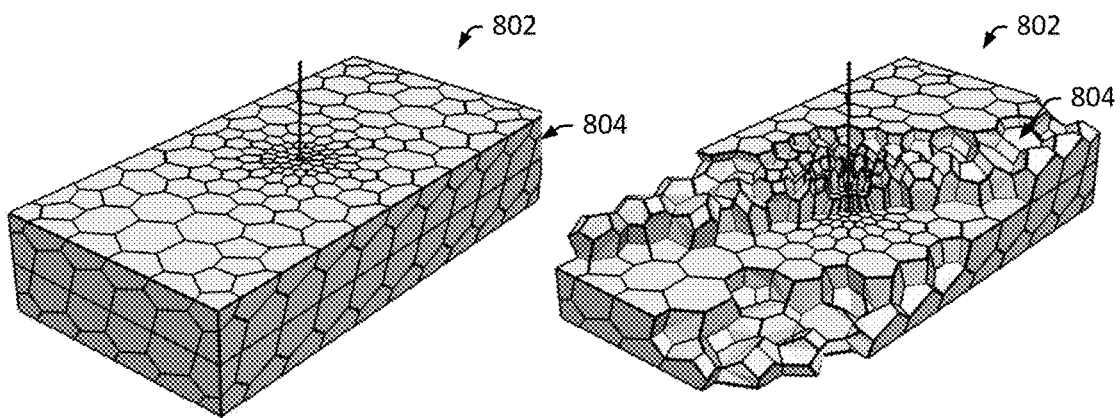
FIG. 8 is a diagram that illustrates a 3D dual mesh in accordance with one or more embodiments.

In some embodiments, the method 200 includes generating a 3D dual mesh for the 3D vertically-refined triangulated tetrahedral mesh (block 216). Generating a 3D dual mesh for the 3D vertically-refined triangulated tetrahedral mesh may include conducting meshing of the 3D vertically-refined triangulated tetrahedral mesh to generate a 3D dual mesh. This may include conducting a Delaunay meshing operation on the 3D vertically-refined triangulated tetrahedral mesh to generate a dual mesh formed of polyhedron shaped cells. For example, generating a 3D dual mesh for the 3D vertically-refined triangulated tetrahedral mesh 702 may include conducting meshing of the 3D vertically-refined triangulated tetrahedral mesh 702 to generate a 3D dual mesh (which may define a dual mesh model 132). FIG. 8 is a diagram that illustrates a 3D dual mesh ("dual mesh") 802 in accordance with one or more embodiments. The dual mesh 802 includes polyhedron shaped cells 804. The right diagram includes a cut-away that illustrates polyhedron shaped cells 804 located in the "interior" of the dual mesh 802.

Figure 9B:
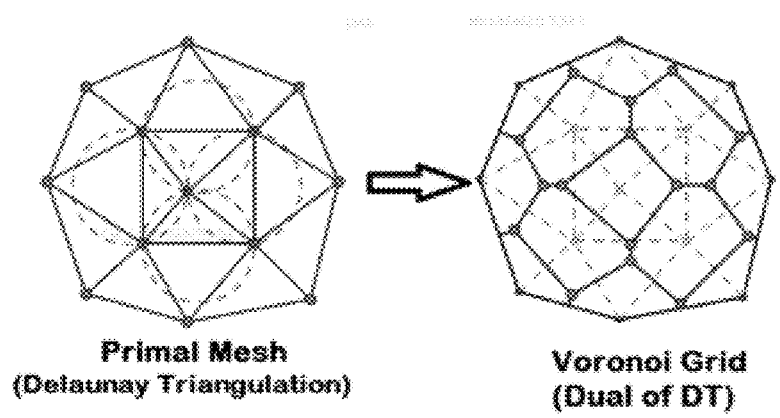
FIG. 9B is a diagram that illustrates an example of Delaunay triangulation and associated voronoi grid in accordance with one or more embodiments.

Notably, Delaunay triangulation (DT) is the dual of a voronoi diagram: given a DT or a voronoi grid, the dual can be constructed. From the grid generation view point, Delaunay triangulation can be worked with directly, and voronoi grids (if required) can be obtained as a dual of the associated Delaunay triangulation. FIG. 9B illustrates an example of Delaunay triangulation and associated voronoi grid, constructed by joining circumcenters of simplexes having an edge adjacency. In a manner similar to 2D, a 3D dual can be constructed by joining centroid (tetra, pyramid, prisms, and hexahedron) of primal cells sharing a primal point.

In some embodiments, the method 200 includes conducting a simulation of the reservoir using the dual mesh (block 218). Conducting a simulation of the reservoir using the dual mesh may include processing a dual mesh model 132 defined by the dual mesh to generate a simulation 134 the reservoir 102. For example, conducting a simulation of the reservoir 102 using the dual mesh 802 may include processing a dual mesh model 132 defined by the dual mesh 802 to generate a simulation the reservoir 102. The simulation 134 may include a prediction of movement of fluids, such as water or hydrocarbons, within the portion of the reservoir 102, over time. For example, a 1-year simulation of the reservoir 102 based on the dual mesh model 132 representing the characteristics of the reservoir on Jan. 1, 2019 may include a prediction of where fluids, such as water or hydrocarbons, will be located within the portion of the reservoir 102 represented by the model 130, on Jan. 1, 2020. In some embodiments, the dual mesh model 132 or the simulation 134 is presented on a graphical display for viewing.

In some embodiments, the method 200 includes developing the reservoir based on the simulation of the reservoir (block 220). Developing the reservoir based on the simulation of the reservoir may include defining or conducting various operations for development of the reservoir based on the simulation of the reservoir. For example, developing the reservoir 102 based on a simulation 134 of the reservoir 102 may include the control system 110 or (another operator of the reservoir 102) determining drilling parameters or operating parameters for wells 112 in the reservoir 102, or controlling drilling or operating of the wells 112 in accordance with the drilling or operating parameters. In some embodiments, a field development plan (FDP) may be generated for the reservoir 102 based on the on a simulation 134 of the reservoir 102. For example, the control system 110 or (another operator of the reservoir 102) may generate a FDP that specifies parameters for developing the reservoir 102, such as the drilling parameters or operating parameters for wells 112 in the reservoir 102 in 2019, based on the on a simulation 134 that indicates predicted fluid movement in the portion of the reservoir 102 represented by the model 130 over the timespan from Jan. 1, 2019 to Jan. 1, 2020.

Figure 10:
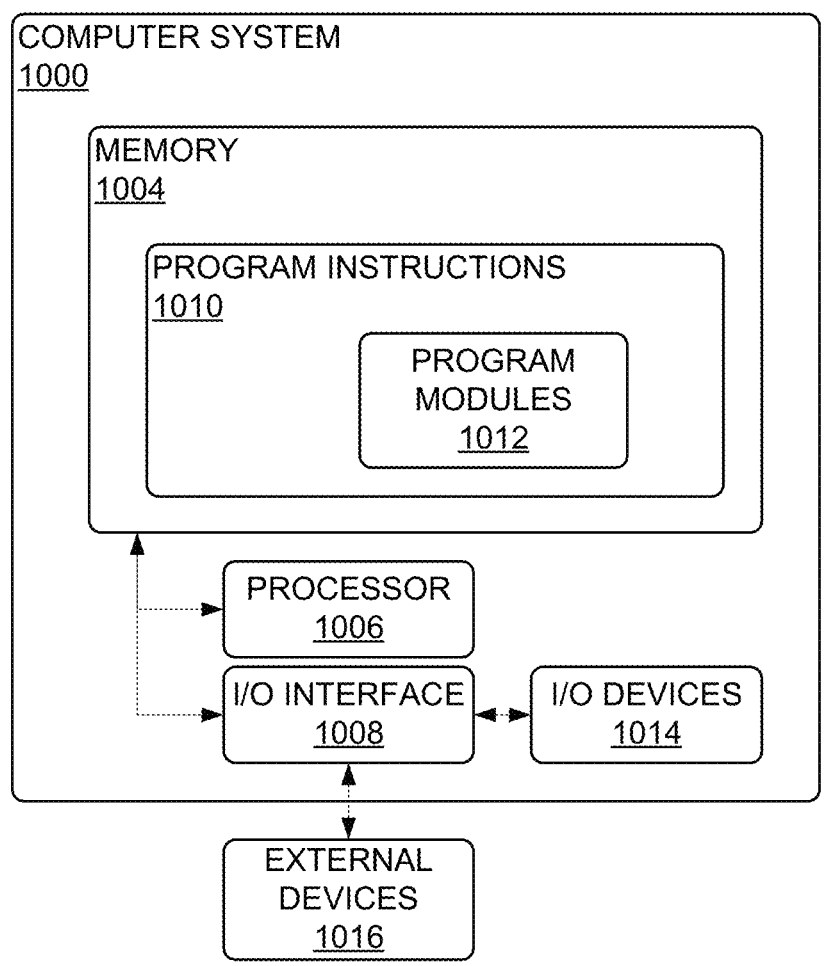
FIG. 10 is a diagram that illustrates an example computer system in accordance with one or more embodiments.

FIG. 10 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored on the medium. The program instructions 1010 may include program modules 1012 that are executable by a computer processor (for example, the processor 1006) to cause the functional operations described, such as those described with regard to the control system 110 or the method 200.

The processor 1006 may be any suitable processor capable of executing program instructions. The processor 1006 may include one or more processors that carry out program instructions (for example, the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different processing cores to generate a simulation of a reservoir. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016, such as sensors, valves, pumps, motors, computers or communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of developing a hydrocarbon reservoir, the method comprising:
   determining a reservoir model of a hydrocarbon reservoir, the reservoir model defining layers representing a portion of the hydrocarbon reservoir;
   determining, for each of the layers of the model, any points of intersection for the layer, the points of intersection comprising one or more points at which the layer is intersected by a path of a well bore extending into the hydrocarbon reservoir;
   generating, for each of the layers of the model, a two-dimensional (2D) unstructured mesh layer comprising a triangulated mesh, the triangulated mesh comprising triangulated refinements at any points of intersection determined for the layer;
   generating, for each pair of adjacent 2D unstructured mesh layers of the reservoir model, a three-dimensional (3D) tetrahedral mesh, the generating of the 3D tetrahedral mesh comprising connecting corresponding points of the pair of adjacent 2D unstructured mesh layers to generate 3D triangulated tetrahedral mesh layers between respective pairs of the 2D unstructured mesh layers;

generating, for the 3D tetrahedral mesh, a 3D triangulated tetrahedral mesh, the generating of the 3D triangulated tetrahedral mesh comprising interlayer well segment triangulation of the 3D tetrahedral mesh to generate 3D triangulated tetrahedral mesh layers corresponding to respective layers of the 3D triangulated tetrahedral mesh layers;

generating, for the 3D triangulated tetrahedral mesh, a 3D vertically-refined triangulated tetrahedral mesh, the generating of the 3D vertically-refined triangulated tetrahedral mesh comprising vertically refining the 3D triangulated tetrahedral mesh, the vertically refining of the 3D triangulated tetrahedral mesh comprising:

for each pair of adjacent 3D triangulated tetrahedral mesh layers of the triangulated tetrahedral mesh:
identifying shared vertices of the pair of adjacent 3D triangulated tetrahedral mesh layers,
shunting the 3D triangulated tetrahedral mesh layers of the pair of adjacent 3D triangulated tetrahedral mesh layers away from one another such that each of the 3D triangulated tetrahedral mesh layers of the pair of adjacent 3D triangulated tetrahedral mesh layers has points corresponding to respective vertices of the shared vertices of the pair of adjacent 3D triangulated tetrahedral mesh layers; and
connecting, for each of the shared vertices of the pair of adjacent 3D triangulated tetrahedral mesh layers, corresponding points of the pair of adjacent 3D triangulated tetrahedral mesh layers to generate a corresponding intermediate layer formed of vertical prisms extending between the 3D triangulated tetrahedral mesh layers of the pair of adjacent 3D triangulated tetrahedral mesh layers;

generating, for the 3D vertically-refined triangulated tetrahedral mesh, a 3D dual mesh, the generating of the 3D dual mesh comprising meshing of the 3D vertically-refined triangulated tetrahedral mesh; and generating, using the 3D dual mesh, a simulation of the hydrocarbon reservoir represented by the layers.

2. The method of claim 1, wherein at least one layer of the layers does not contain a point of intersection and the 2D unstructured mesh layer for the at least one of the layers does not include triangular refinements.

3. The method claim 1, wherein at least one of the points of intersection comprise one or more points at which a layer of the reservoir model is intersected by a geologic feature of the hydrocarbon reservoir.

4. The method of claim 1, wherein the triangulated refinements for each of the points of intersection comprises a 2D cell comprising the point of intersection being divided into cells of a first size and a cell located away from the point of intersection being divided into cells a second size that is greater than first size.

5. The method of claim 1, wherein the generating of the 3D tetrahedral mesh for a pair of adjacent 2D unstructured mesh layers comprises conducting a Delaunay meshing operation on the pair of adjacent 2D unstructured mesh layers to connect the corresponding points of the adjacent 2D unstructured mesh layers.

6. The method of claim 1, wherein the generating of the 3D triangulated tetrahedral mesh comprises conducting stitching to mesh interlayer well segments of the 3D tetrahedral mesh.

7. The method of claim 1, wherein the generating of the 3D vertically-refined triangulated tetrahedral mesh comprises conducting a Delaunay meshing operation on the 3D vertically-refined triangulated tetrahedral mesh to generate the 3D dual mesh formed of polyhedron shaped cells.

8. The method of claim 1, further comprising generating, based on the simulation of the hydrocarbon reservoir, a field development plan (FDP) for the simulation of the hydrocarbon reservoir.

9. The method of claim 1, further comprising:
identifying, based on the simulation of the hydrocarbon reservoir, well drilling parameters; and
drilling, based on the well drilling parameters, a well in the hydrocarbon reservoir.

10. The method of claim 1, further comprising:
identifying, based on the simulation of the hydrocarbon reservoir, well operating parameters; and
operating, based on the well operating parameters, a well in the hydrocarbon reservoir.

11. A non-transitory computer readable storage medium comprising program instructions stored thereon that are executable by a processor to perform the following operations for developing a hydrocarbon reservoir:

determining a reservoir model of a hydrocarbon reservoir, the reservoir model defining layers representing a portion of the hydrocarbon reservoir;

determining, for each of the layers of the model, any points of intersection for the layer, the points of intersection comprising one or more points at which the layer is intersected by a path of a well bore extending into the hydrocarbon reservoir;

generating, for each of the layers of the model, a two-dimensional (2D) unstructured mesh layer comprising a triangulated mesh, the triangulated mesh comprising triangulated refinements at any points of intersection determined for the layer;

generating, for each pair of adjacent 2D unstructured mesh layers of the reservoir model, a three-dimensional (3D) tetrahedral mesh, the generating of the 3D tetrahedral mesh comprising connecting corresponding points of the pair of adjacent 2D unstructured mesh layers to generate 3D triangulated tetrahedral mesh layers between respective pairs of the 2D unstructured mesh layers;

generating, for the 3D tetrahedral mesh, a 3D triangulated tetrahedral mesh, the generating of the 3D triangulated tetrahedral mesh comprising interlayer well segment triangulation of the 3D tetrahedral mesh to generate 3D triangulated tetrahedral mesh layers corresponding to respective layers of the 3D triangulated tetrahedral mesh layers;

generating, for the 3D triangulated tetrahedral mesh, a 3D vertically-refined triangulated tetrahedral mesh, the generating of the 3D vertically-refined triangulated tetrahedral mesh comprising vertically refining the 3D triangulated tetrahedral mesh, the vertically refining of the 3D triangulated tetrahedral mesh comprising:

for each pair of adjacent 3D triangulated tetrahedral mesh layers of the triangulated tetrahedral mesh:
identifying shared vertices of the pair of adjacent 3D triangulated tetrahedral mesh layers,
shunting the 3D triangulated tetrahedral mesh layers of the pair of adjacent 3D triangulated tetrahedral mesh layers away from one another such that each of the 3D triangulated tetrahedral mesh layers of the pair of adjacent 3D triangulated tetrahedral mesh layers has points corresponding to respective vertices of the shared vertices of the pair of adjacent 3D triangulated tetrahedral mesh layers; and connecting, for each of the shared vertices of the pair of adjacent 3D triangulated tetrahedral mesh layers, corresponding points of the pair of adjacent 3D triangulated tetrahedral mesh layers to generate a corresponding intermediate layer formed of vertical prisms extending between the 3D triangulated tetrahedral mesh layers of the pair of adjacent 3D triangulated tetrahedral mesh layers;

generating, for the 3D vertically-refined triangulated tetrahedral mesh, a 3D dual mesh, the generating of the 3D dual mesh comprising meshing of the 3D vertically-refined triangulated tetrahedral mesh; and generating, using the 3D dual mesh, a simulation of the hydrocarbon reservoir represented by the layers.

12. The medium of claim 11, wherein at least one layer of the layers does not contain a point of intersection and the 2D unstructured mesh layer for the at least one layer does not include triangular refinements.

13. The medium of claim 11, wherein at least one of the points of intersection comprise one or more points at which a layer of the reservoir model is intersected by a geologic feature of the hydrocarbon reservoir.

14. The medium of claim 11, wherein the triangulated refinements for each of the points of intersection comprises a 2D cell comprising the point of intersection being divided into cells of a first size and a cell located away from the point of intersection being divided into cells a second size that is greater than first size.

15. The medium of claim 11, wherein the generating of the 3D tetrahedral mesh for a pair of adjacent 2D unstructured mesh layers comprises conducting a Delaunay meshing operation on the pair of adjacent 2D unstructured mesh layers to connect the corresponding points of the adjacent 2D unstructured mesh layers.

16. The medium of claim 11, wherein the generating of the 3D triangulated tetrahedral mesh comprises conducting stitching to mesh interlayer well segments of the 3D tetrahedral mesh.

17. The medium of claim 11, wherein the generating of the 3D vertically-refined triangulated tetrahedral mesh comprises conducting a Delaunay meshing operation on the 3D vertically-refined triangulated tetrahedral mesh to generate the 3D dual mesh formed of polyhedron shaped cells.

18. The medium of claim 11, the operations further comprising generating, based on the simulation of the hydrocarbon reservoir, a field development plan (FDP) for the simulation of the hydrocarbon reservoir.

19. The medium of claim 11, the operations further comprising:
identifying, based on the simulation of the hydrocarbon reservoir, well drilling parameters; and
controlling drilling, based on the well drilling parameters, of a well in the hydrocarbon reservoir.

20. The medium of claim 11, the operations further comprising:
identifying, based on the simulation of the hydrocarbon reservoir, well operating parameters; and
controlling operating, based on the well operating parameters, of a well in the hydrocarbon reservoir.

21. A hydrocarbon reservoir development system comprising:
a hydrocarbon reservoir control system non-transitory computer readable storage medium comprising program instructions stored thereon that are executable by a processor to perform the following operations for developing a hydrocarbon reservoir:

determining a reservoir model of a hydrocarbon reservoir, the reservoir model defining layers representing a portion of the hydrocarbon reservoir;

determining, for each of the layers of the model, any points of intersection for the layer, the points of intersection comprising one or more points at which the layer is intersected by a path of a well bore extending into the hydrocarbon reservoir;

generating, for each of the layers of the model, a two-dimensional (2D) unstructured mesh layer comprising a triangulated mesh, the triangulated mesh comprising triangulated refinements at any points of intersection determined for the layer;

generating, for each pair of adjacent 2D unstructured mesh layers of the reservoir model, a three-dimensional (3D) tetrahedral mesh, the generating of the 3D tetrahedral mesh comprising connecting corresponding points of the pair of adjacent 2D unstructured mesh layers to generate 3D triangulated tetrahedral mesh layers between respective pairs of the 2D unstructured mesh layers;

generating, for the 3D tetrahedral mesh, a 3D triangulated tetrahedral mesh, the generating of the 3D triangulated tetrahedral mesh comprising interlayer well segment triangulation of the 3D tetrahedral mesh to generate 3D triangulated tetrahedral mesh layers corresponding to respective layers of the 3D triangulated tetrahedral mesh layers;

generating, for the 3D triangulated tetrahedral mesh, a 3D vertically-refined triangulated tetrahedral mesh, the generating of the 3D vertically-refined triangulated tetrahedral mesh comprising vertically refining the 3D triangulated tetrahedral mesh, the vertically refining of the 3D triangulated tetrahedral mesh comprising:

for each pair of adjacent 3D triangulated tetrahedral mesh layers of the triangulated tetrahedral mesh:
identifying shared vertices of the pair of adjacent 3D triangulated tetrahedral mesh layers,
shunting the 3D triangulated tetrahedral mesh layers of the pair of adjacent 3D triangulated tetrahedral mesh layers away from one another such that each of the 3D triangulated tetrahedral mesh layers of the pair of adjacent 3D triangulated tetrahedral mesh layers has points corresponding to respective vertices of the shared vertices of the pair of adjacent 3D triangulated tetrahedral mesh layers; and
connecting, for each of the shared vertices of the pair of adjacent 3D triangulated tetrahedral mesh layers, corresponding points of the pair of adjacent 3D triangulated tetrahedral mesh layers to generate a corresponding intermediate layer formed of vertical prisms extending between the 3D triangulated tetrahedral mesh layers of the pair of adjacent 3D triangulated tetrahedral mesh layers;

generating, for the 3D vertically-refined triangulated tetrahedral mesh, a 3D dual mesh, the generating of the 3D dual mesh comprising meshing of the 3D vertically-refined triangulated tetrahedral mesh; and generating, using the 3D dual mesh, a simulation of the hydrocarbon reservoir represented by the layers.

22. The system of claim 21, wherein at least one layer of the layers does not contain a point of intersection and the 2D unstructured mesh layer for the at least one layer does not include triangular refinements.

23. The system of claim 21, wherein at least one of the points of intersection comprise one or more points at which a layer of the reservoir model is intersected by a geologic feature of the hydrocarbon reservoir.

24. The system of claim 21, wherein the triangulated refinements for each of the points of intersection comprises a 2D cell comprising the point of intersection being divided into cells of a first size and a cell located away from the point of intersection being divided into cells a second size that is greater than first size.

25. The system of claim 21, wherein the generating of the 3D tetrahedral mesh for a pair of adjacent 2D unstructured mesh layers comprises conducting a Delaunay meshing operation on the pair of adjacent 2D unstructured mesh layers to connect the corresponding points of the adjacent 2D unstructured mesh layers.

26. The system of claim 21, wherein the generating of the 3D triangulated tetrahedral mesh comprises conducting stitching to mesh interlayer well segments of the 3D tetrahedral mesh.

27. The system of claim 21, wherein the generating of the 3D vertically-refined triangulated tetrahedral mesh comprises conducting a Delaunay meshing operation on the 3D vertically-refined triangulated tetrahedral mesh to generate the 3D dual mesh formed of polyhedron shaped cells.

28. The system of claim 21, the operations further comprising generating, based on the simulation of the hydrocarbon reservoir, a field development plan (FDP) for the simulation of the hydrocarbon reservoir.

29. The system of claim 21, the operations further comprising:
   identifying, based on the simulation of the hydrocarbon reservoir, well drilling parameters; and
   controlling drilling, based on the well drilling parameters, of a well in the hydrocarbon reservoir.

30. The system of claim 21, the operations further comprising:
   identifying, based on the simulation of the hydrocarbon reservoir, well operating parameters; and
   controlling operating, based on the well operating parameters, of a well in the hydrocarbon reservoir.

* * * * *